United States Patent
Rohrer et al.

(10) Patent No.: US 12,546,345 B2
(45) Date of Patent: Feb. 10, 2026

(54) AUTO-SIPHON DRAINAGE SYSTEM FOR AIRCRAFT

(71) Applicant: Textron Innovations Inc., Providence, RI (US)

(72) Inventors: James Brendan Rohrer, Fort Worth, TX (US); Carlos Alexander Fenny, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 348 days.

(21) Appl. No.: 18/358,484

(22) Filed: Jul. 25, 2023

(65) Prior Publication Data

US 2025/0035138 A1   Jan. 30, 2025

(51) Int. Cl.
*B64C 1/14*   (2006.01)
*F15D 1/02*   (2006.01)

(52) U.S. Cl.
CPC .............. *F15D 1/02* (2013.01); *B64C 1/1453* (2013.01)

(58) Field of Classification Search
CPC ......... F15D 1/02; B64C 1/1453; B64C 27/04; B64D 1/16; F02C 7/232; F01M 11/04; F04D 10/00
See application file for complete search history.

(56) References Cited

U.S. PATENT DOCUMENTS

| | | | | |
|---|---|---|---|---|
| 5,996,938 | A * | 12/1999 | Simonetti | B64C 1/1453 244/129.1 |
| 9,321,520 | B2 * | 4/2016 | Otero | B64C 1/1453 |
| 10,167,741 | B2 * | 1/2019 | Lacko | B64C 1/1453 |
| 11,118,540 | B2 * | 9/2021 | Slayter | F02M 25/0872 |
| 2013/0193271 | A1 * | 8/2013 | Otero | B64C 1/1453 244/136 |
| 2017/0122128 | A1 * | 5/2017 | Lacko | F01D 25/32 |
| 2020/0224612 | A1 * | 7/2020 | Slayter | B64D 37/06 |

* cited by examiner

*Primary Examiner* — Eldon T Brockman
(74) *Attorney, Agent, or Firm* — Akona IP PC (57) ABSTRACT

An aircraft comprising a fuselage; a vent disposed through a bottom surface of the fuselage; and a drainage system for transporting fluid leaked from a fluid source out of the fuselage via the vent in response to a first condition, the drainage system comprising a container having a top and a bottom; and a siphon tube within the container, the siphon tube having an inlet and an outlet and comprising a 180 degree bend between the inlet and the outlet.

14 Claims, 9 Drawing Sheets

AUTO-SIPHON DRAINAGE SYSTEM FOR AIRCRAFT

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to the field of aircraft and, more particularly, though not exclusively, to an auto-siphon drainage system for such aircraft, particularly rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Various aspects of the illustrative implementations may be described using terms commonly employed by those skilled in the art to convey the substance of their work to others skilled in the art. The terms "substantially," "close," "approximately," "near," and "about," generally refer to being within +/−20% of a target value (e.g., within +/−5 or 10% of a target value) based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms "over," "under," "between," and "on" as used herein refer to a relative position of one material layer or component with respect to other layers or components. For example, one component disposed over or under another component may be directly in contact with the other component or may have one or more intervening components. Moreover, one component disposed between two components may be directly in contact with one or both of the two components or may have one or more intervening components. In contrast, a first component described to be "on" a second component refers to a component that is in direct contact with that second component. Similarly, unless explicitly stated otherwise, one feature disposed between two features may be in direct contact with the adjacent features or may have one or more intervening components. In addition, the term "dispose" as used herein refers to position, location, placement, and/or arrangement rather than to any particular method of formation.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. When used herein, the notation "A/B/C" means (A), (B), and/or (C).

Example embodiments that may be used to implement the features and functionality of this disclosure will now be described with more particular reference to the attached figures.

Figure 1A:
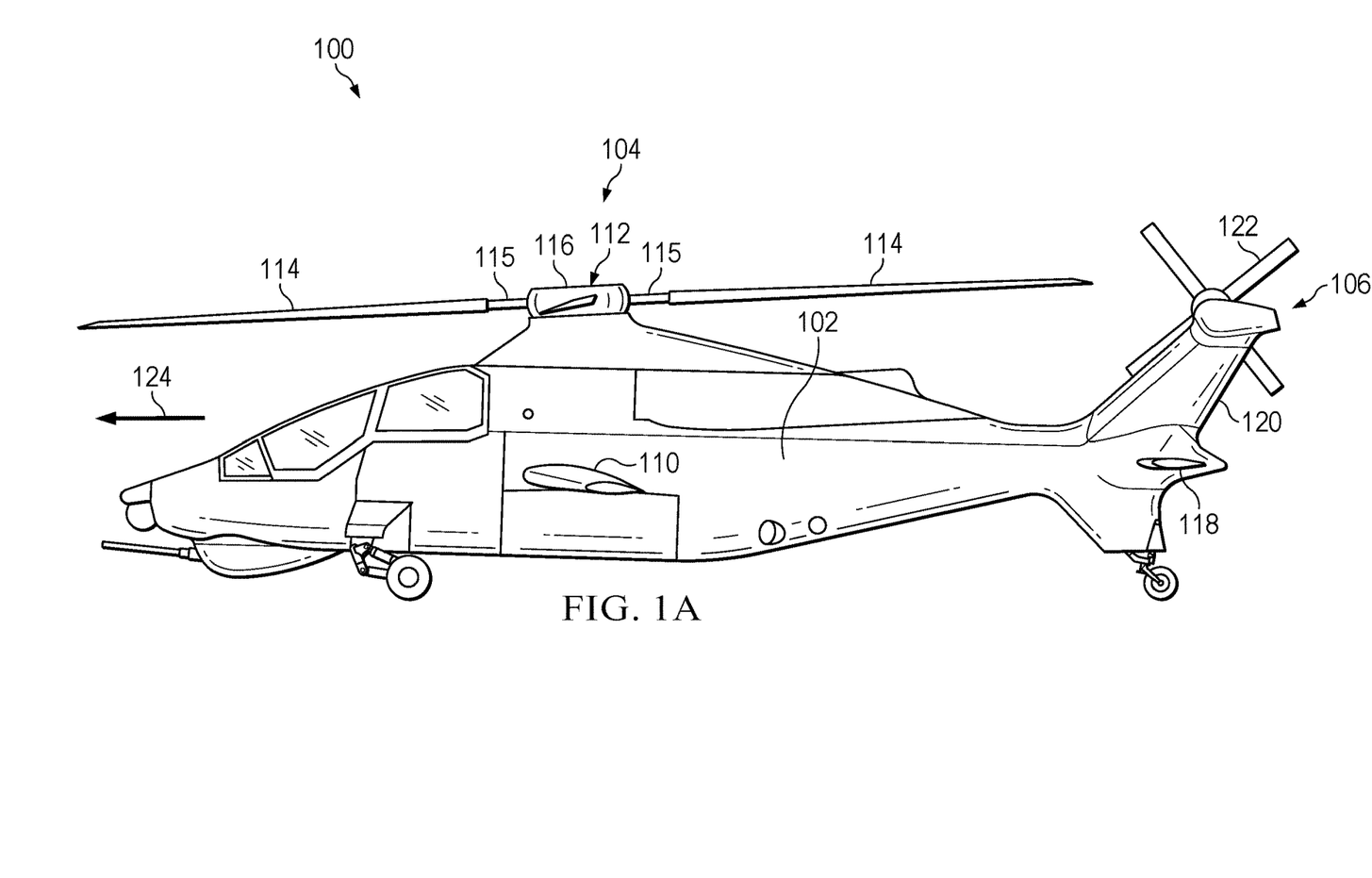
FIGS. 1A and 1B illustrate an example rotorcraft in accordance with features of embodiments described herein.
Figure 1B:
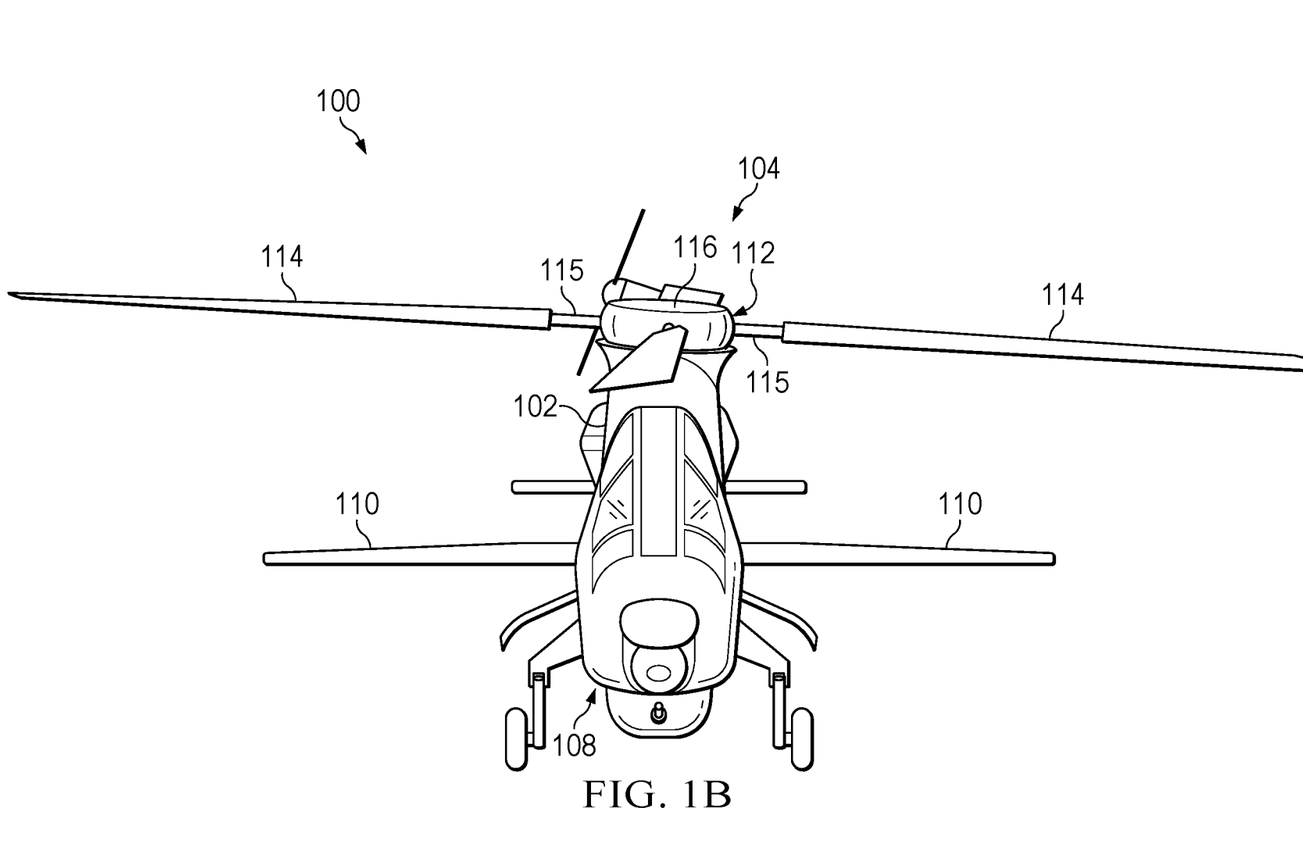

FIGS. 1A and 1B respectively illustrate a side view and a front view of an example aircraft, which in the illustrated example is a rotorcraft 100. As shown in FIGS. 1A and 1B, rotorcraft 100 includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of particular embodiments, the fuselage 102 can also include a payload bay covered by a payload bay door 108 disposed under a wing 110, which in some embodiments includes a support structure and actuation mechanism for extending externally stowed payload (e.g., weapons) outboard away from the fuselage 102 to a firing position. It will be recognized that, although not shown in the view illustrated in FIG. 1A, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1A, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades," "yoke/blades," "hub/yoke/blades," and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Rotary-wing aircraft, or rotorcraft, such as rotorcraft 100, are often required to serve a variety of functions. For example, in some instances, rotorcraft may be required to lift heavy objects and either hover in place or move at a relatively low rate of speed. In other instances, rotorcraft may be required to move at a relatively high rate of speed, particularly when they are not lifting an object or otherwise engaged in stationary flight operations.

One example of a rotorcraft that may be called upon to perform multiple functions is a military helicopter, such as an attack helicopter. An attack helicopter may be required at times to hover while loitering over a battlefield or providing close air support, and at other times may be required to move at a relatively high rate of speed to respond to a call for close air support.

Drains serve a variety of functions with respect to aircraft operation. One such function is to reduce the potential fire hazard resulting from retention of flammable fluids within the aircraft. Another such function is to remove corrosive fluids from the aircraft structure. At best, poor drainage may lead to corrosion premature structural and/or equipment failure; at worst, poor drainage can lead to an immediate fire hazard that could result in loss of life and/or property. While removal of unwanted fluid from an aircraft is important, it is also important that such removal be performed in a manner that does not create a hazard that could be as detrimental as the condition itself.

Figure 2A:
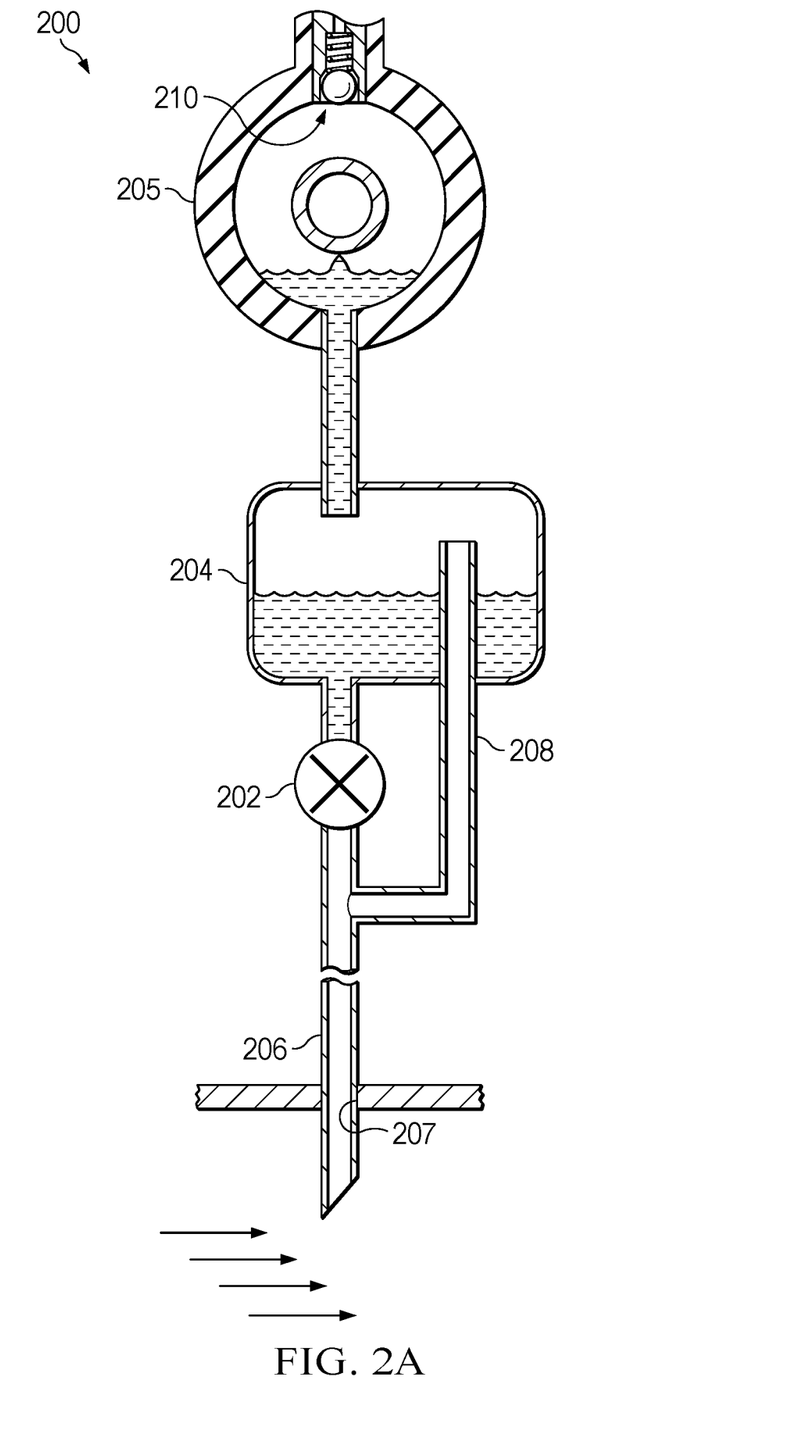
FIGS. 2A-2C illustrate a drainage system for aircraft in accordance with features of conventional embodiments.
Figure 2B:
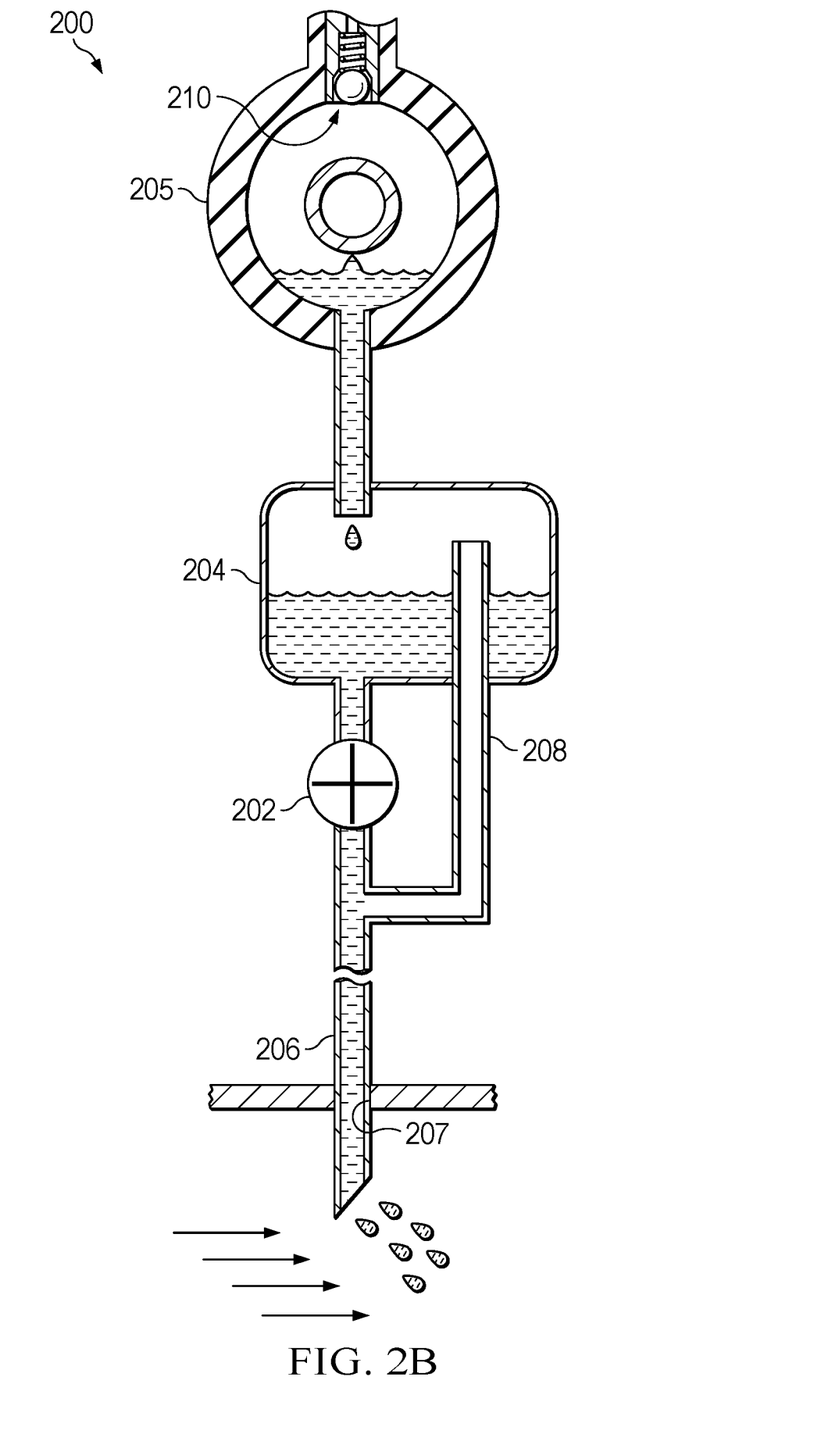
Figure 2C:
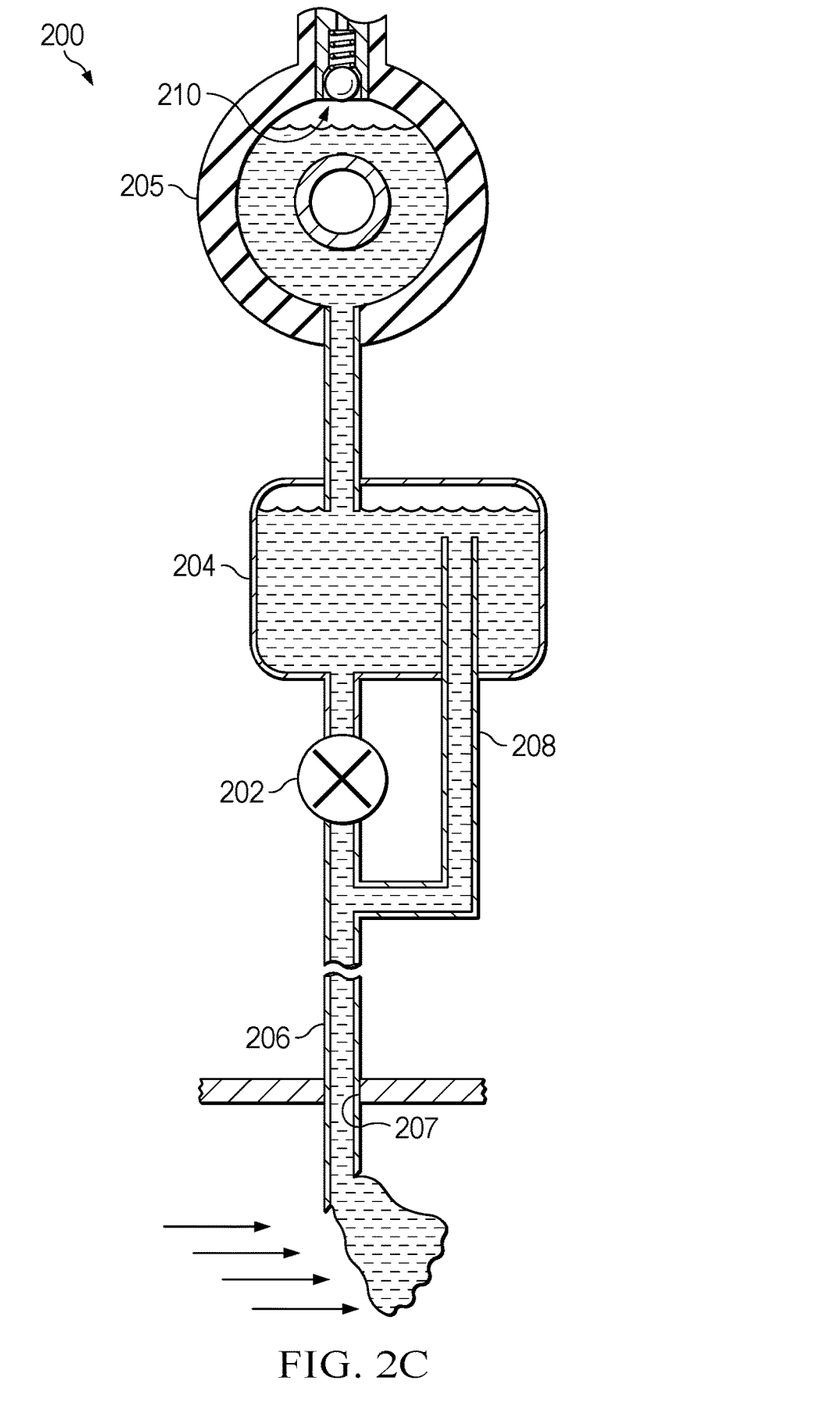

Referring now to FIGS. 2A-2C, in a conventional drainage system 200 for an aircraft, such as aircraft 100, a valve 202 may be provided for allowing fluid collected in a container 204 from a fluid source 205 to drain from the container through a pipe or tube 206 and out of the aircraft via an opening, or vent, 207 through the bottom surface (or outer mold line (OML)) of the aircraft. In the illustrated embodiment, fluid source 205 comprises a shaft seal, although other fluid sources (as described below) may be accommodated by system 200.

Valve 202 may be electrically actuated, which actuation may be controlled manually (e.g., by a pilot) or may be automatic. An overflow pipe or tube 208 may be provided to allow for drainage of container 204 to prevent overflow of container in the event valve 202 fails to operate properly. System 200 may be located in a fuselage (e.g., fuselage 102) of an aircraft (e.g., aircraft 100). FIG. 2A illustrates a situation in which valve 202 is in a closed position and a level of fluid within container 204 is such that no fluid flows from container 204 through tube 206 and out of the aircraft via opening 207. FIG. 2B illustrates a situation in which valve 202 is in an open position such that fluid flows from container 204 through tube 206 and out of the aircraft via opening 207. FIG. 2C illustrates a situation in which valve 202 is in a closed position and presumably inoperable and a fluid level in container 204 is such that fluid flows through overflow tube 208 into tube 206 and out of the aircraft via opening 207. Solutions such as system 200 may add significant weight and complexity to the architecture of an aircraft. In particular, such systems require implementation of valves, wiring and controls, all of which introduce failure modes and negatively impact maintenance and reliability metrics as well as increasing development and design costs. In particular embodiments, a vent check valve 210 may be provided on a top of a closed volume in which fluid source 205 is located to permit ventilation of the closed volume and to prevent fluid from escaping.

Figure 3A:
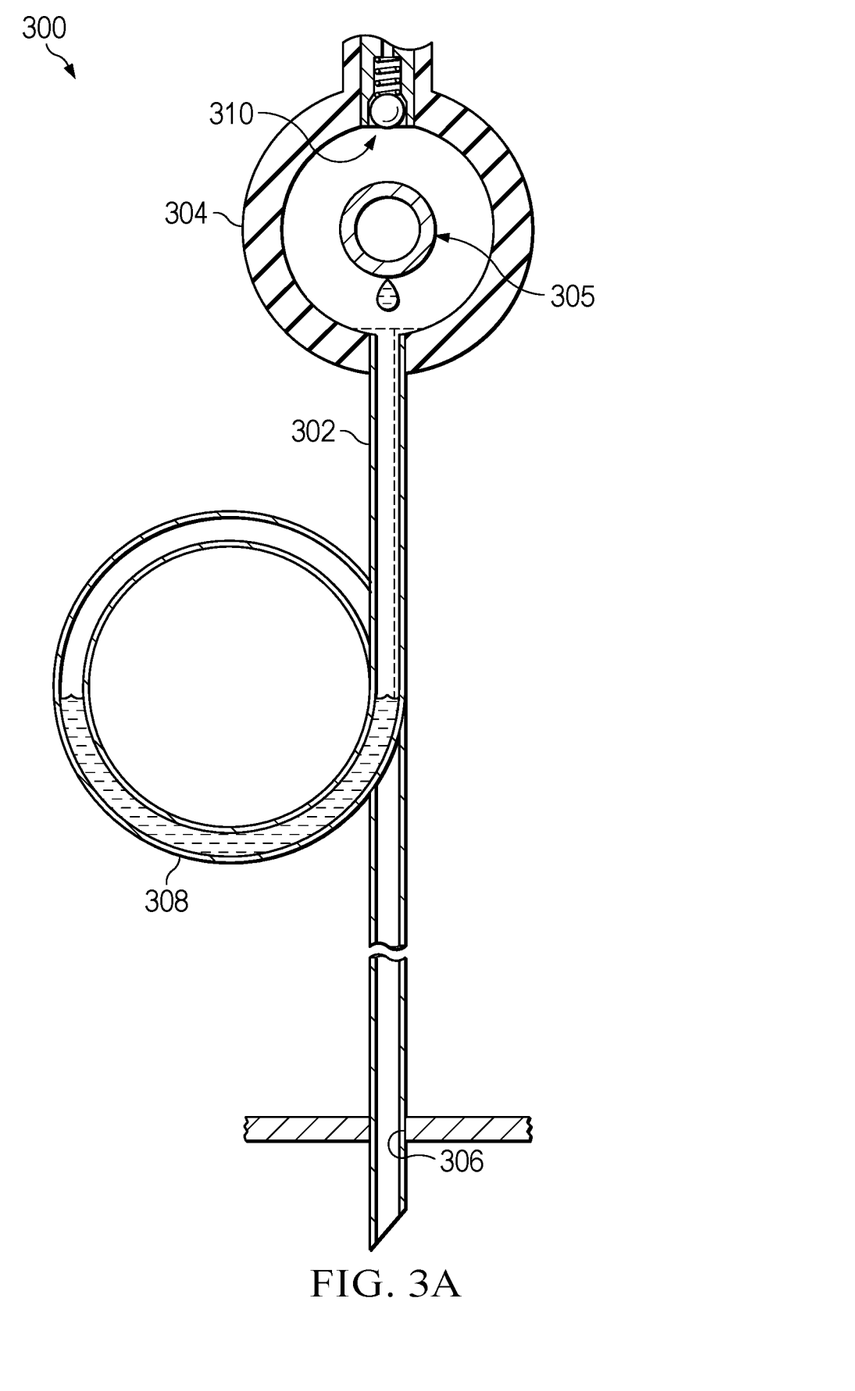
FIGS. 3A-3C illustrate an auto-siphon drainage system for aircraft in accordance with features of embodiments described herein.
Figure 3B:
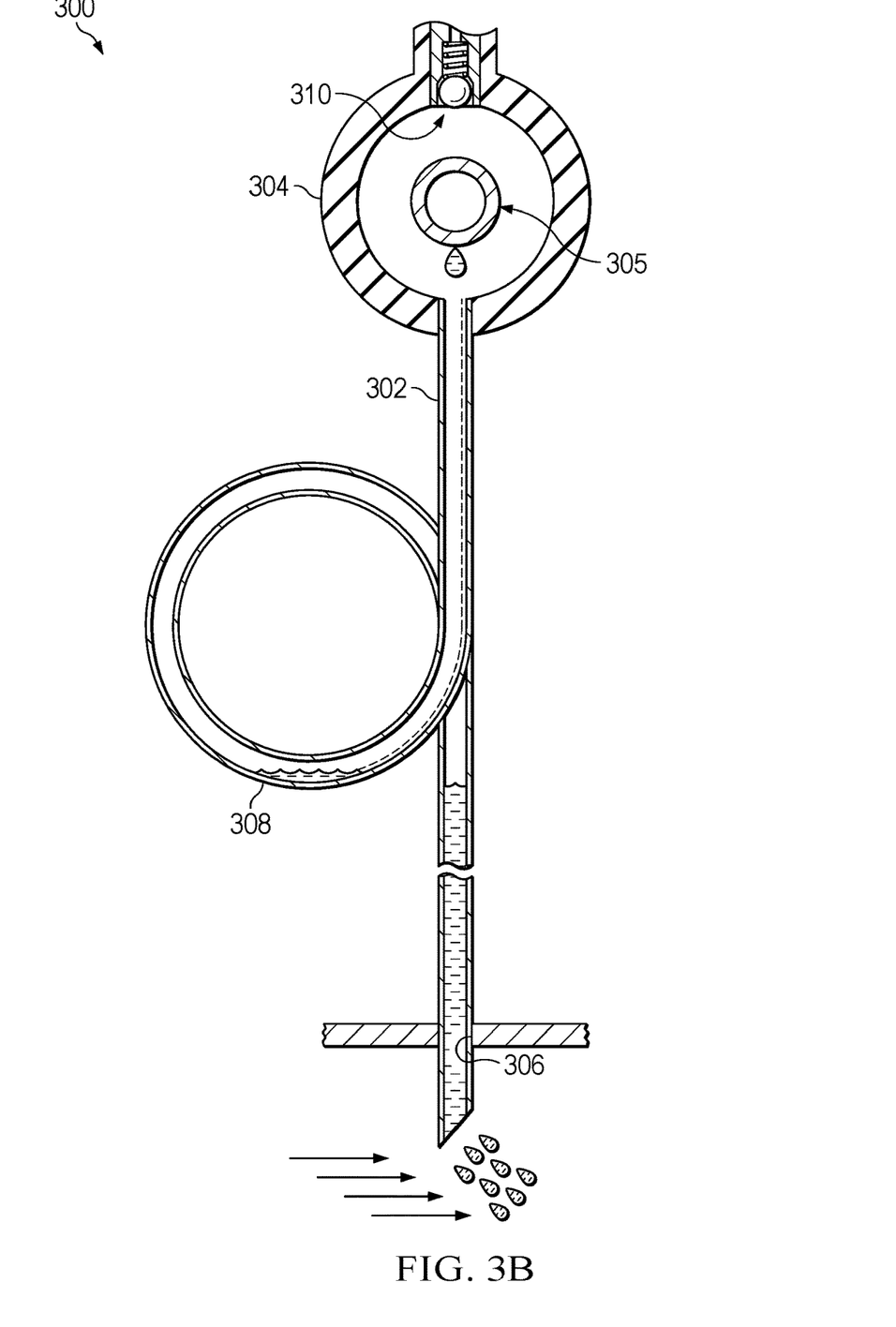
Figure 3C:
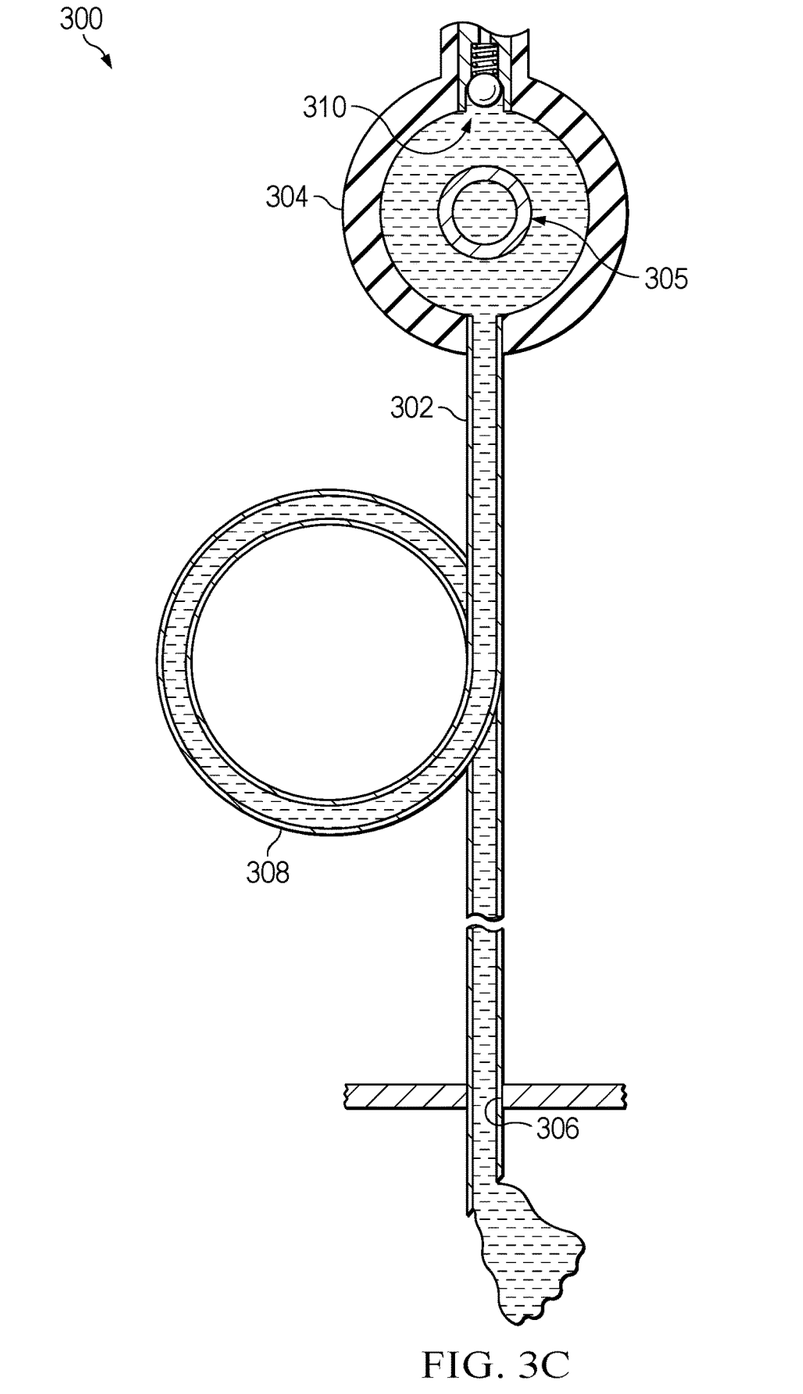

Referring now to FIGS. 3A-3C, an auto-siphon drainage system for an aircraft, such as aircraft 100, in accordance with features of embodiments described herein is designated by a reference numeral 300. System 300 may be located in a fuselage (e.g., fuselage 102) of an aircraft (e.g., aircraft 100). As shown in FIGS. 3A-3C, system 300 includes a coil, or siphon, tube 302 connected to receive fluid from a fluid source comprising a closed volume 304 (such as an accessory drive pad for providing an interface between a generator and a gear box, for example). Closed volume 304 is where leakage from shaft seals, such as a shaft seal 305, may collect. In the illustrated embodiment, siphon tube 302 includes a 360 degree bend 308 between an inlet and an outlet thereof. Siphon tube 302 may transport fluid that leaks from fluid source 304 out of the aircraft via an opening, or vent, 306 in the bottom surface (i.e., OML) of the aircraft. In particular embodiments, a vent check valve 310 may be provided on a top of closed volume 304 to permit ventilation of the closed volume and to prevent fluid from escaping.

FIG. 3A illustrates operation of system 300 when the aircraft in which it is installed is stationary. As shown in FIG. 3A, when the aircraft is stationery (and therefore presumably grounded), fluid that intermittently drips from fluid source 304 into siphon tube 302 may collect in the bottom of the 360 degree bend portion 308 of the siphon tube 302 until suction pressure is applied at vent 306. In some embodiments, suction applied at vent 306 may be machine suction, such as from a vacuum, applied by a maintenance operator.

FIG. 3B illustrates operation of system 300 when the aircraft in which it is installed is in flight. As shown in FIG. 3B, when the aircraft is in flight, fluid that leaks into siphon tube 302 from fluid source 304 may be drawn out of the siphon tube 302 (and the airplane) by suction pressure created at vent 306 by flight conditions. Alternatively, when the aircraft is not in flight, suction pressure may be applied at vent 306 to create a pressure differential and draw fluid out of the siphon tube 302.

It will be recognized that siphon flow rate, or siphon rate, is determined by Bernoulli's principle as dictated by the physical characteristics of the system as installed on an aircraft.

In both of the situations illustrated in FIGS. 3A and 3B, the volume and flow rate of fluid leaking into siphon tube 302 from fluid source 304 are relatively low, due at least in part to the shaft seal 305, which, as it wears over time, will leak more fluid. In each situation, fluid is leaking faster than the siphon can accommodate. The cavity fills and causes a vent check valve 307 to close, at which point pressure in the cavity increases, thus increasing the flow rate to keep up with the source fluid flow. FIG. 3C illustrates operation of system 300 upon failure of the seal 305 at the interface of fluid source 304 and siphon tube 302, creating a high volume of liquid flowing into the siphon tube from the source at a high flow rate. In this scenario, the fluid is urged out of the siphon tube 302 (and the airplane) by the pressure created by the high flow volume, which may be aided by suction pressure created at vent 306 by flight conditions if the aircraft is in flight.

Figure 4:
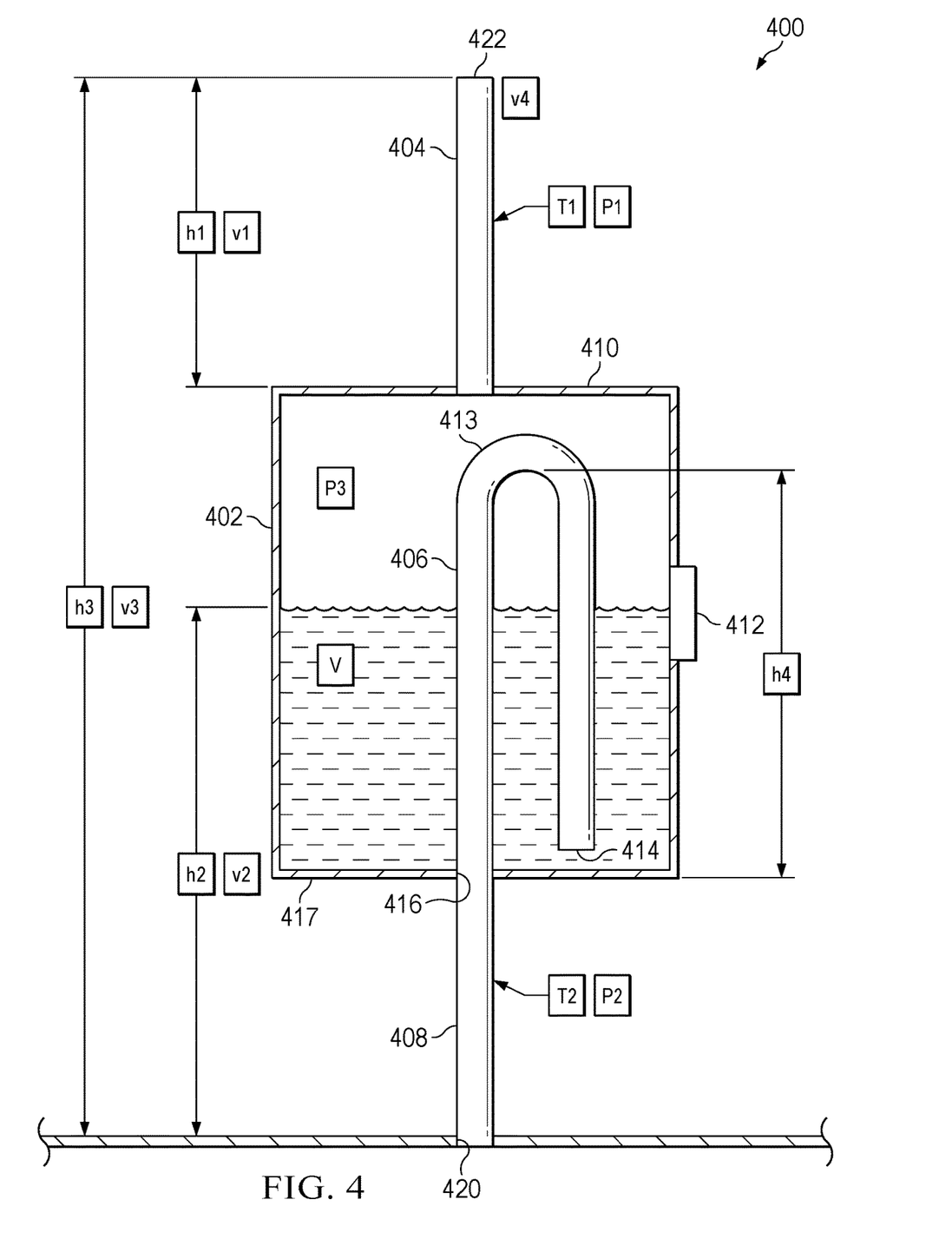
FIG. 4 illustrates an auto-siphon drainage system for aircraft in accordance with features of alternative embodiments described herein.

Referring now to FIG. 4, an auto-siphon drainage system for an aircraft, such as aircraft 100, in accordance with features of alternative embodiments described herein is designated by a reference numeral 400. System 400 may be located in a fuselage (e.g., fuselage 102) of an aircraft (e.g., aircraft 100). As shown in FIG. 4, system 400 includes a container 402, an inlet tube 404, an internal siphon tube 406, and a drain tube 408. In particular embodiments, container 402 is pressure tight and appropriately sized for the amount of fluid it is designed to retain before the container empties. In some embodiments, a top surface 410 of container 402 may include a lid portion that can be removed such that the contents of container 402 may be inspected. Container 402 may also include a level sight gauge 412 so that the volume of the fluid inside container 402 may be determined.

Inlet tube 404 originates at a source of leaked fluid (not shown in FIG. 4) and terminates at and is connected to top 410 of container 402. In particular embodiments, shaft seals of mechanically driven components, such as hydraulic pumps, generators, starters, etc., which may be mounted to a gearbox with a drive pad as an interface, comprise sources of leaked fluids in an aircraft. Other sources of leaked fluids in an aircraft may include components driven by electric motors as well as zonal drains provided in zones (or compartments) that have to be drained. In general, any structure having an interface that may result in leaked fluid may comprise a leaked fluid source for purposes of embodiments described herein.

Top 410 of container 402 may include an opening to which an end of inlet tube 404 may be connected via one of any number of appropriate connection methods and mechanisms. In particular embodiments, inlet tube 404 is separably connected to container 402 such that container 402 can be removed as a line replaceable unit (LRU). For example, a threaded coupling mechanism, or fitting, could be provided on the end of inlet tube 404 to enable it to engage with a corresponding threaded coupling mechanism, or fitting, provided on top 410 of container 402. Alternatively, quick connect couplings, or fittings, may be used in place of threaded fittings.

Internal siphon tube 406 includes a 180° bend 413. An inlet 414 of internal siphon tube 406 is positioned to intake fluid from the bottom of container 402. An outlet 416 of internal siphon tube 406 connects to an exit disposed in the bottom of container 402. A connection similar to the connection provided for the inlet tube 404 is provided on the outside of a bottom 417 of container 402 and aligned with the exit for separable connection thereto by drain tube 408. Bend 413 is designed in such a manner that a predetermined pressure differential will draw fluid from container 402. Internal siphon tube 406 is further designed such that a predetermined volume of fluid in container 402 will overspill the bend 413 thus causing the remaining fluid to be siphoned from container.

As noted above, drain tube 408 is separably connected to a connection provided on the bottom of container 402 aligned, thereby effectively connecting drain tube with outlet 416 of internal siphon tube 406. Mechanisms for coupling drain tube 408 to bottom 417 of container may be the same as described above with respect to separable connection of inlet tube 404 to top 410 of container 402. Drain tube 408 is of sufficient length, diameter, and height from an aircraft exit point (e.g., a vent) 420 to cause fluid to be drawn from container 402 at a desired volume and flow rate as defined by Bernoulli's principle. As will be described in greater detail below, system 400 is sized to allow a maximum fluid flow rate at an origin 422 of inlet tube 404. In particular embodiments, origin 422 of inlet tube 404 may be disposed in a vented area, rather than a closed, confined space. In embodiments in which inlet tube 404 originates in a closed, confined space (as with systems 200 and 300), a vent check valve that allows air in and that closes when fluid overflows may be incorporated into the system 400 in a manner similar to systems 200 and 300.

As shown in FIG. 4, the following variables have the following definitions:
  $P1$=pressure at component/compartment comprising the fluid source
  $P2$=pressure at aircraft outer mold line (OML)
  $P3$=pressure in container
  $v1$=flow rate of fluid into container
  $v2$=flow rate of fluid out of container
  $v3$=maximum flow rate capacity of siphon
  $v4$=source flow rate h1=height of fluid source above container (length of inlet tube)

h2=height of top of fluid level in tank above aircraft OML h3=height of fluid source above aircraft OML h4=height of bend of internal siphon tube above bottom of container V=volume of fluid in container In a first scenario ("Scenario 1"), in which v1 is low and the aircraft is on the ground, fluid accumulates in container 402 until P1=P3>P2, at which point fluid will be forced, or blown, out of container 402 by siphon tube 408 at a rate v2 until P1=P2=P3.

In a second scenario ("Scenario 2"), in which v1 is slow and the aircraft is in flight, such that P2<P1=P3, fluid will fill drain tube 408 and internal siphon tube 406 until active siphoning begins and fluid is emptied, or sucked, out of container 402 at a rate v2 until P1=P2=P3.

In a third scenario ("Scenario 3"), in which v1 is fast and the aircraft is either on the ground or in flight, such that P1>P3>P2, fluid will fill container 402 until fluid spills over 180 degree bend 413, at which point active siphoning begins and container is emptied at a rate v3 until P1=P2=P3.

In a fourth scenario ("Scenario 4"), in which container 402 is not draining and P3>P2>P1, which is indicative of fluid in inlet tube 404 and a stoppage or odd flight profile in drain tube 408. This condition will reverse flow in inlet tube 404, resulting in fluid being pushed back to the source. Failure modes, effects, and critical analysis (FMECA) may be initiated in response to this situation.

In a fifth scenario ("Scenario 5"), in which v4 exceeds v3 and P1>P3>P2, system 400 will operate as usual; however, fluid will back up at the source due to the fact that there is more leaked fluid than the system can remove, as fluid is being introduced into the system faster than it can be drained thereby.

In particular embodiments, tubes 404, 406, 408, should be sized such that the siphon rate (v3) is greater than the source flow rate (v4). Drain tube 408 should be designed in accordance with Bernoulli's principle such that h4 is not large enough to prevent P2 from being able to draw fluid out. Additionally, drain tube 408 should be placed on OML of the aircraft such that flight conditions create a sufficient differential between P1 and P2. In particular, low pressure at the OML should be sufficient to empty the tank prior to it overflowing the bend 413 by drawing fluid up into the siphon tube and over the bend.

In contrast to system 300, in system 400 H4 can be set such that container 302 will empty at a certain pressure differential between P2 and P3. Additionally, a level indicator can be provided on container 302. Moreover, container 402 supports achievement of a target volume better than coil tube 302 does. Finally, system 400 better enables an operator to determine what type and how much fluid is leaking, as the fluid is retained in container 402.

Example 1 provides an aircraft including a fuselage; a vent disposed through a bottom surface of the fuselage; and a drainage system for transporting fluid leaked from a fluid source out of the fuselage via the vent in response to a first condition, the drainage system including a container having a top and a bottom; and a siphon tube within the container, the siphon tube having an inlet and an outlet and including a 180 degree bend between the inlet and the outlet.

Example 2 provides the aircraft of example 1, wherein the outlet of the siphon tube is connected to an opening provided in the bottom of the container.

Example 3 provides the aircraft of example 2, further including a drain tube removably connected to the bottom of the container in alignment with the opening provided in the bottom of the container.

Example 4 provides the aircraft of example 1, further including an inlet tube removably connected to a top of the container in alignment with an opening in the top of the container.

Example 5 provides the aircraft of example 1, wherein the drainage system further includes a sight gauge associated with the container for visually determining a level of fluid within the container.

Example 6 provides the aircraft of example 1, wherein the container includes a removable lid.

Example 7 provides the aircraft of example 1, wherein the first condition includes a pressure differential in which a pressure outside the vent is less than a pressure at a top of the siphon tube.

Example 8 provides the aircraft of example 5, wherein the pressure differential is created by flight conditions when the aircraft is in flight.

Example 9 provides the aircraft of example 5, wherein the pressure differential is created by manual application of a suction force at the vent.

Example 10 provides the aircraft of example 1, wherein the drainage system includes a line replaceable unit.

Example 11 provides an aircraft including a fuselage; a vent disposed through a bottom surface of the fuselage; and a drainage system for transporting fluid leaked from a fluid source out of the fuselage via the vent, the drainage system including a siphon system having a first end connected to receive the leaked fluid and a second end connected to expel the leaked fluid from the siphon system through the vent under a first condition.

Example 12 provides the aircraft of example 11, wherein the drainage system further includes a seal at an interface between the fluid source and an inlet of the siphon system.

Example 13 provides the aircraft of example 11, wherein the seal controls a volume of the leaked fluid that is received into the siphon system and a flow rate at which the leaked fluid is received into the siphon system.

Example 14 provides the aircraft of example 11, wherein the first condition includes a pressure differential in which a pressure outside the vent is less than a pressure at a top of the siphon tube.

Example 15 provides the aircraft of example 14, wherein the pressure differential is created by flight conditions when the aircraft is in flight.

Example 16 provides the aircraft of example 14, wherein the pressure differential is created by manual application of a suction force at the vent.

Example 17 provides a drainage system for an aircraft, the drainage system for siphoning fluid leaked from a fluid source out of the aircraft through a vent in a bottom surface of the aircraft in response to a pressure differential between the drainage system and an area outside the vent, the drainage system including a container having a top and a bottom; and a siphon tube within the container, the siphon tube having an inlet and an outlet and including a 180 degree bend between the inlet and the outlet.

Example 18 provides the drainage system of example 17, wherein the outlet of the siphon tube is connected to an opening provided in a bottom of the container.

Example 19 provides the drainage system of example 18, further including a drain tube removably connected to the bottom of the container in alignment with the opening provided in the bottom of the container; and an inlet tube removably connected to a top of the container in alignment with an opening provided in the top of the container.

Example 20 provides the drainage system of example 17, wherein the drainage system further includes a sight gauge for visually indicating a level of fluid within the container.

The diagrams in the FIGURES illustrate the architecture, functionality, and operation of possible implementations of various embodiments of the present disclosure. It should also be noted that, in some alternative implementations, the function(s) associated with particular FIGURES may occur out of the order presented. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

What is claimed is:

1. An aircraft comprising:
    a fuselage;
    a vent disposed through a bottom surface of the fuselage; and
    a drainage system for transporting fluid leaked from a fluid source out of the fuselage via the vent in response to a first condition, the drainage system comprising:
        a container having a top and a bottom; and
        a siphon tube within the container, the siphon tube having an inlet and an outlet and comprising a 180 degree bend between the inlet and the outlet.

2. The aircraft of claim 1, wherein the outlet of the siphon tube is connected to an opening provided in the bottom of the container.

3. The aircraft of claim 2, further comprising a drain tube removably connected to the bottom of the container in alignment with the opening provided in the bottom of the container.

4. The aircraft of claim 1, further comprising an inlet tube removably connected to a top of the container in alignment with an opening in the top of the container.

5. The aircraft of claim 1, wherein the drainage system further comprises a sight gauge associated with the container for visually determining a level of fluid within the container.

6. The aircraft of claim 1, wherein the container comprises a removable lid.

7. The aircraft of claim 1, wherein the first condition comprises a pressure differential in which a pressure outside the vent is less than a pressure at a top of the siphon tube.

8. The aircraft of claim 5, wherein the pressure differential is created by flight conditions when the aircraft is in flight.

9. The aircraft of claim 5, wherein the pressure differential is created by manual application of a suction force at the vent.

10. The aircraft of claim 1, wherein the drainage system comprises a line replaceable unit.

11. A drainage system for an aircraft, the drainage system for siphoning fluid leaked from a fluid source out of the aircraft through a vent in a bottom surface of the aircraft in response to a pressure differential between the drainage system and an area outside the vent, the drainage system comprising:
    a container having a top and a bottom; and
    a siphon tube within the container, the siphon tube having an inlet and an outlet and comprising a 180 degree bend between the inlet and the outlet.

12. The drainage system of claim 11, wherein the outlet of the siphon tube is connected to an opening provided in a bottom of the container.

13. The drainage system of claim 12, further comprising:
    a drain tube removably connected to the bottom of the container in alignment with the opening provided in the bottom of the container; and
    an inlet tube removably connected to a top of the container in alignment with an opening provided in the top of the container.

14. The aircraft of claim 11, wherein the drainage system further comprises a sight gauge for visually indicating a level of fluid within the container.

* * * * *